United States Patent
Yarmolich et al.

(10) Patent No.: US 7,509,267 B1
(45) Date of Patent: Mar. 24, 2009

(54) METHOD FOR COMBINING DATA SIGNALS AND VIDEO SIGNALS FOR TRANSMISSION TO VIDEO DISPLAY UNITS

(75) Inventors: Paul M. Yarmolich, 308 Montoya, Danville, CA (US) 94526; Mark Reagen, Phoenix, AZ (US)

(73) Assignee: Paul M. Yarmolich, Danville, CA (US)

( * ) Notice: Subject to any disclaimer, the term of this patent is extended or adjusted under 35 U.S.C. 154(b) by 0 days.

(21) Appl. No.: 09/649,657

(22) Filed: Aug. 29, 2000

(51) Int. Cl.
*G06Q 30/00* (2006.01)

(52) U.S. Cl. .............................. 705/14; 705/1; 705/26; 705/27

(58) Field of Classification Search ................... 705/26, 705/27, 14; 348/589, 600, 564, 552, 553, 348/554, 555, 556, 565; 725/32, 34, 35
See application file for complete search history.

(56) References Cited

U.S. PATENT DOCUMENTS

| | | | | |
|---|---|---|---|---|
| 5,027,211 A | * | 6/1991 | Robertson | 348/516 |
| 5,233,423 A | * | 8/1993 | Jernigan et al. | 348/564 |
| 5,412,416 A | * | 5/1995 | Nemirofsky | 725/36 |
| 5,734,853 A | | 3/1998 | Hendricks et al. | |
| 5,761,601 A | * | 6/1998 | Nemirofsky et al. | 725/34 |
| 5,874,985 A | * | 2/1999 | Matthews, III | 348/7 |
| 5,929,849 A | | 7/1999 | Kikinis | |
| 6,020,863 A | * | 2/2000 | Taylor | 345/3.1 |
| 6,029,045 A | * | 2/2000 | Picco et al. | 455/5.1 |
| 6,463,585 B1 | * | 10/2002 | Hendricks et al. | 725/35 |
| 6,507,949 B1 | * | 1/2003 | Jonason et al. | 725/22 |
| 6,591,247 B2 | * | 7/2003 | Stern | 705/14 |
| 6,957,041 B2 | * | 10/2005 | Christensen et al. | 455/3.06 |
| 6,973,438 B1 | * | 12/2005 | Philyaw | 705/26 |
| 7,389,253 B2 | * | 6/2008 | Townsend et al. | 705/26 |
| 2001/0043285 A1 | * | 11/2001 | Hicks et al. | 348/600 |
| 2001/0053996 A1 | * | 12/2001 | Atkinson | 705/14 |
| 2001/0054180 A1 | * | 12/2001 | Atkinson | 725/32 |
| 2002/0116717 A1 | * | 8/2002 | Eller et al. | 725/105 |
| 2004/0194131 A1 | | 9/2004 | Ellis et al. | |

OTHER PUBLICATIONS

Motorola's Broadband Communications Sector Integrates ACTV's Innovative Technology Into Headend Equipment and Encoder Lines, Business, Technology, and Entertainment Editors. Business Wire, New York, Feb. 28, 2000, pp. 1-3.*

* cited by examiner

*Primary Examiner*—Jeffrey A. Smith
*Assistant Examiner*—Jason Dunham
(74) *Attorney, Agent, or Firm*—Factor & Lake, Ltd.

(57) ABSTRACT

A method capable of combining data signals and video signals for transmission to a video display unit. The method comprises the steps of generating a data signal, transmitting the data signal to an apparatus, receiving the data signal at the apparatus, receiving a video/audio signal at the apparatus, combining the video/audio signal with the data signal to form a single combined signal, and displaying the combined signal on a video display unit.

19 Claims, 1 Drawing Sheet

METHOD FOR COMBINING DATA SIGNALS AND VIDEO SIGNALS FOR TRANSMISSION TO VIDEO DISPLAY UNITS

BACKGROUND OF THE INVENTION

1. Field of the Invention

The invention is directed primarily towards multimedia, and more particularly, towards a business method for combining data signals and video signals for transmission to video display units. The method permits the combining of broadcast (or otherwise transmitted) video signals with received data signals which comprise graphics and alphanumeric text, wherein the data signals may be unique for each video display unit.

2. Background Art

Since the advent of video, televisions and other video displays have become commonplace in virtually every venue. For example, televisions and video displays are commonly found in the home, office, airports, hotels, restaurants, and bars, to name just a few. Indeed, it is difficult to find a place where televisions are inaccessible or otherwise not available.

Televisions are generally used for receiving and displaying broadcast signals from such sources as terrestrial transmissions, cable transmissions and/or satellite transmissions. Such transmissions are disseminated to a wide number of televisions and to numerous geographic regions.

Most transmissions include advertising in the form of commercials. Typically, such commercials comprise 15 to 60 second spots between scenes of a show, innings of a baseball game, etc. These commercials are transmitted to a generally wide audience of viewers. For example, a typical terrestrial broadcast in the Chicago area is disseminated to several million people. Thus, it is not possible to tailor commercials for each particular home, bar, and hotel within the geographic area.

Additionally, one of the most effective manners in which to provide information to individuals is by transmission over television. Indeed, at a broadcaster level, inclement weather conditions can be scrolled across the bottom of a screen. However, such messages are disseminated to the entire viewing public. As such, there is no manner in which, for example, a tavern can advertise specials over television screens, especially without adversely affecting the ability to view the regularly transmitted video signal.

Thus, it is an object of the invention to facilitate the combination of a video signal with a data signal which may be transmitted to a video display unit.

It is a further object of the invention to facilitate the transmission of unique data signals for combination with video signals to individual video display units.

These and other objects will become evident in light of the specification and the claims appended hereto.

SUMMARY OF THE INVENTION

The invention comprises a business method for combining data signals and video signals for transmission to a video display unit. In particular, the method comprises the steps of (a) generating a data signal; (b) transmitting the data signal to an apparatus; (c) receiving the data signal at the apparatus and utilizing it to create textual and graphic images; (d) receiving a video/audio signal at the apparatus; (e) combining the video/audio signal with the data signal to form a single combined signal; and (f) displaying the combined signal on a video display unit.

In a preferred embodiment, the step of generating a data signal comprises the step of generating a data signal on a remote computer. In one such embodiment, the step of transmitting the data signal to an apparatus comprises the step of connecting the apparatus with a remote computer. In such an embodiment, the step of connecting includes the use of a modem.

In a preferred embodiment, the step of receiving the data signal further comprises the step of storing the data signal in the apparatus.

In another preferred embodiment, the step of combining comprises the step of (a) resizing the video signal; (b) positioning the video signal along a portion of the video display unit; and (c) positioning the data signal so as to be separate from the video signal on the video display unit.

In yet another preferred embodiment, the step of combining comprises the step of (a) positioning the video signal along a portion of the video display unit; and (b) positioning the data signal so as to overlie at least a portion of the video display unit.

In a preferred embodiment, the step of transmitting comprises the step of transmitting the combined signal to a plurality of video display units.

In another preferred embodiment, the video signal comprises one of the group consisting of terrestrial signals, cable signals, satellite signals, local cameras, remote cameras, video tape recorders and/or DVD players.

The invention likewise comprises a method for individually transmitting data signals to video display units. The method comprises the steps of (a) associating at least one apparatus with at least one video display unit; (b) associating the at least one apparatus with a data source; (c) transmitting a data signal from the data source to the at least one apparatus; and (d) transmitting a data signal from the at least one apparatus to the at least one video display unit.

In a preferred embodiment, the method further comprises the steps of (a) transmitting a video signal to the at least one apparatus; (b) combining the video signal with the data signal; and (c) transmitting the combined video signal along with the step of transmitting the data signal from the at least one apparatus to the at least one video display unit.

In a preferred embodiment, the step of associating an apparatus with a video display unit comprises the step of associating a plurality of video display units with a single apparatus. In one such preferred embodiment, the step of transmitting a data signal from the data source to the at least one apparatus comprises the step of transmitting a unique data signal from the data source to each of the apparatuses. In one such embodiment, the method further comprises the steps of (a) transmitting a video signal to each apparatus; (b) combining the video signal with the data signal at each apparatus; and (c) transmitting the combined video signal along with the step of transmitting the data signal from each apparatus to the video display unit. Preferably, each apparatus receives a single video signal or a unique video signal.

BEST MODE FOR PRACTICING THE INVENTION

Figure 1:
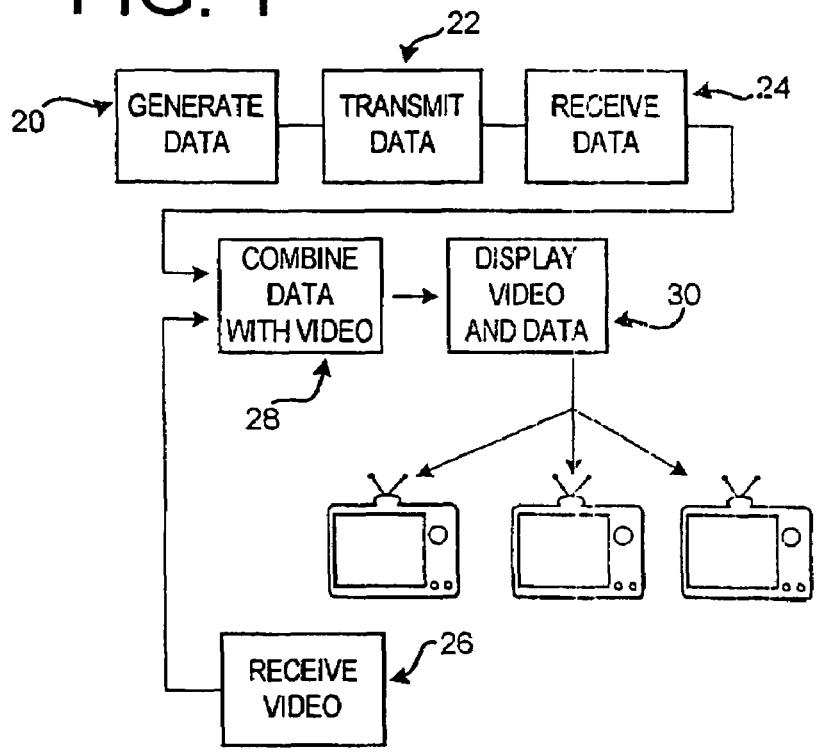
FIG. 1 of the drawings is a schematic of the method of the present invention.

While this invention is susceptible of embodiment in many different forms, there is shown in the drawings and will be described in detail, several specific embodiments with the understanding that the present disclosure is to be considered as an exemplification of the principles of the invention and is not intended to limit the invention to the embodiments illustrated.

The method for disseminating data images to video display units is shown schematically in FIG. 1 as comprising the steps of generating a data signal 20, transmitting a data signal to an apparatus 22, receiving the data signal 24, receiving a video/audio signal 26, combining the video/audio signals with the data signals 28 and displaying the combined signal on a desired display unit 30. Generally, the data will comprise some type of advertisement or informative bulletin. However, the data is not limited to any particular format or content. For example, the data may comprise any 24 bit graphic images and/or 8 bit text. The broadcast signal may comprise any one of a multitude of signals, including but not limited to terrestrial signals, cable signals, satellite signals, local cameras, remote cameras, video tape recorders and/or DVD players. It will be understood that the video/audio signal and the data signal are not limited to any particular type of signal type or signal source.

The particular apparatus for combining the signals is disclosed and claimed in copending application entitled "INFORMATION PROCESSING APPARATUS". In other embodiments, the apparatus may be combined with cable boxes, satellite dish boxes, set top boxes (i.e. those marketed under the name WebTV), personal computers, as well as with television sets themselves. It is contemplated that each video display unit will have its own apparatus for combining video/audio signals with data signals, or that a single apparatus will control the video display units for a particular locality (i.e. for a restaurant, bar, or airport, etc.). By associating an apparatus with a single video display unit or only a couple of video display units, the data signals transmitted to the video display units can be controlled on a display by display basis. In turn, the distribution of data signals can be well tailored to a specific target audience with precision.

Once these apparatuses have been placed at the desired locations and associated with video display units, the next step in the method is to obtain advertising or bulletin information from subscribers to the system from which the data signals can be generated. For example, an entity desirous of advertising to a predetermined audience can create advertisements for eventual display on certain video display units. It will be understood that the data signal is not limited to any particular type of information, i.e. advertisements, bulletins and/or other information in the form of graphic images and/or text.

To generate an advertisement, the advertiser can contact the operator of the system which may include a staff of designers and marketers that generate an electronic advertisement capable of display on a video display unit. Alternatively, the advertiser may design its own advertisement on a computer (or have an outside entity design an advertisement). This advertisement can then be uploaded to the system servers. In another embodiment, the advertisement generating system comprises a web-based self-service system wherein the advertiser can design its advertisement. In any event, the advertisement is placed onto a computer and converted into data stored on the system server.

In addition to the generation of an advertisement, the advertiser indicates as to which apparatuses he wishes to receive the information. The advertisement can be directed to a single apparatus or to multiple apparatuses spread around any geographic area. The apparatuses can be grouped in various manners, including geographic, type of establishment, subscribers to a particular product, etc. Indeed, the various groupings are limitless, since the apparatuses can be individually controlled. For example, a particular advertisement may comprise an advertisement for an alcoholic product. The advertisement can be directed to all video display units that are associated with, for example, sports bars which feature the particular alcoholic product, or to a particular chain of sports bars which are offering specials relative to the alcoholic product.

Next, the advertisements must be transmitted to the individual targeted apparatuses. In one embodiment of the invention, the system server is associated with the Internet, and each apparatus includes a modem and appropriate hardware and software for connecting with the system server over the Internet and downloading the appropriate data which corresponds to the advertisements which are to be displayed on video display unit. The apparatus can be preset to connect to the system server through the Internet at predetermined times. In other embodiments, the apparatus may be continuously connected to the Internet (DSL, dial-up or Cable Internet connection) and capable of continuously receiving data signals. In another embodiment, the system server may be reached directly by modem, instead of through the Internet.

In another embodiment, the system server can be associated with a local computer either directly or over the Internet. In such an embodiment, the local computer receives data from the system server for local apparatuses. Subsequently, the data is transferred to the apparatus via any one of a variety of means (serial ports, parallel ports, IRDA, USB, etc.). Of course, various other embodiments are likewise contemplated. For example, a service man can upload information to the apparatus at predetermined intervals by traveling from location to location and connecting a device directly to each apparatus. Generally, the data comprises a low bandwidth format such as Flash sold by Macromedia. Of course, other formats are likewise contemplated.

Once the data is transferred to the apparatus, the apparatus processes the data into images and text (i.e., decodes the signal received locally, or otherwise processes a coded or decoded signal). In certain embodiments, the apparatus decodes the data signal, which decoding results in the creation and manipulation of text and graphics. The copending application discusses in detail the manner in which video/audio signals can be combined with data signals. In addition to the images and the text, the data signal may include information as to when the data signal is to be combined with the video/audio image for transmission to the video display unit. For example, the data signal may be configured so as to be transmitted as part of a combined video/audio and data signal every 20 minutes, or every hour, or, in certain instances continuously. In other embodiments, the apparatus can locally schedule the display of information received from the data signal.

Figure 2:
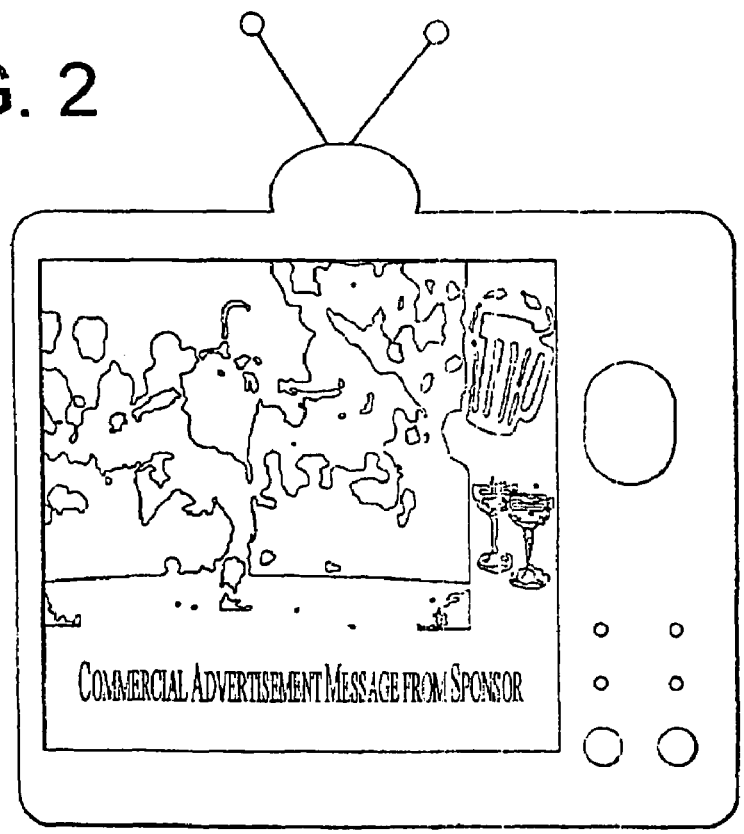
FIG. 2 of the drawings is an elevational view of the display unit and signal.

Thus, at the specified predetermined times, as generally scheduled by the apparatus locally, the images and text are then combined with the video signal received by the apparatus. As explained above, such a video/audio signal is transmitted to the apparatus from any one of a number of sources. Once combined, this combined signal is transmitted to the video display unit associated with the particular apparatus. In certain embodiments, as shown in FIG. 2, the apparatus can combine the signals in such a manner that the video image is reduced so that it occupies only a portion of the screen, and, in turn, the images and text (data signal) are projected onto the remaining portion of the screen. In other embodiments, the images and text can be positioned so as to overlie a portion of the video display. Indeed, any combination of the video/audio signal and the data signal is contemplated, and the method is not limited to any particular configuration. As will be understood, while not required, it is advantageous to combined the video/audio signal and the data signal in such a manner so as not to disrupt the video/audio signal.

While the system is contemplated to include advertisements, bulletins and information It is likewise contemplated that the system can be adapted as download speeds increase, processor speeds increase and/or compression algorithms improve to receive larger quantities of data signals, such as data signals corresponding to full stream video. In such an embodiment, the apparatus can be programmed to display only the video generated from the data signal. In turn, the apparatus can be utilized to create a broadcast network that relies on data signals only. At other times, it will be understood that the combined signal will comprise only a video signal, and no data signal component.

The operation of the system will be described in the environment of an airport, with the understanding that it is not limited to such an environment. Generally, an airport includes a multitude of video display units which televise such programs as CNN Airport Network. The programming is transmitted continuously to all of the televisions. In accordance with the invention, each video display unit is associated with an apparatus capable of combining video/audio signals. For example, the video display units in a particular terminal or corridor of gates may be associated with a single apparatus. Conversely, each video display unit may be associated with a single apparatus.

Possible advertisers on the system may include restaurants, taverns, newsstands and shops in the airport, as well as hotels, rental car agencies and other ground transportation providers, just to name a few. These advertisers contact the coordinator of the system and an advertisement for the particular advertiser is created and stored on the system server. Subsequently, information is entered regarding the apparatuses which are to receive the advertisement. For example, the advertisement may be directed only to those video display units which are in a particular corridor or a particular terminal.

Once the advertisement and dissemination information are stored in the system server, the advertisement is ready for transmission to the video display units. The individual apparatuses in the airport may be hard wired to a local central computer which is, in turn, connected to the system server. Once the connection is established, the local central computer downloads the information from the system server, from where the information is transferred to the individual apparatuses. Once stored in the apparatus, the data signal is combined with the video/audio signal (in this case the CNN Airport Network) and the combined signal is output to the video display unit. As explained above, various methods of combining the two signals is contemplated so that the information from both signals appears on the video display unit.

The system can likewise be associated with an airport warning system which can transmit data signals which comprise emergency warnings and instructions to each apparatus in the event of an emergency at the airport.

The system is equally applicable in a tavern setting. For example, what are termed "sports bars" generally include a plurality of video display units which broadcast various sporting events from around the world. Each such video display can be equipped with an apparatus of the type identified above. The bar owner can, for example, create advertisements for evening specials and upcoming special events at the sports bar. These advertisements can be saved as a data signal on a local computer. The local computer can be associated with the apparatus, such that the signal can be transmitted to the apparatus. At a predetermined time, the apparatus can combine this data signal and the video signal into a single combined signal for output to the video display units in the sports bar. In addition, certain advertisers (i.e. alcoholic beverage or tobacco manufacturers/suppliers) can pay the owner of the sports bar and the provider of the apparatus a fee for advertising on the video display units.

The above-identified examples are only for purposes of illustration, and the system and method are not limited for use in solely these environments. Indeed, the usefulness of the system and the method lies with the fact that the apparatuses are provided for individual video display units. Thus, each individual video display unit (or a designated group of display units) can receive individual instructions, so that, for example, each video display unit can display a different data signal regardless of the video signal that is received and regardless of the geographic location of the video display unit. This is advantageous because advertisements, bulletins and other information that comprises the data signal can be disseminated on a video display by video display basis.

Another advantage of the system and the method is that the data signal generally does not disrupt the video/audio signal. Thus, the advertisements and other information which are included in the data signal can be displayed concurrently with the video/audio signal, thereby allowing patrons to view the information from the data signal without interfering with the program or video/audio signal that viewers are watching.

The method of payment for the advertising can be administered in many fashions. Payment can be derived from advertisers on a per video display basis, users of the apparatus can be paid a fee for accepting advertisements over the apparatus, owners of establishments can be provided with apparatuses for free or for a cost upon the signing of an advertising contract. Indeed, the invention is quite capable of generating revenue from both operators and advertisers, and is not limited to any particular method of payment or revenue generation.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A method for combining data signals and video signals for transmission to a video display unit comprising the steps of:

grouping at least one apparatus from a plurality of apparatuses based on geographic area or type of establishment into an apparatus group;

selecting the apparatus group comprising the at least one apparatus wherein the selection is based, at least in part, on the geographic area or type of establishment wherein the at least one apparatus is located;

transmitting a data signal over a computer network to the selected apparatus group, the data signal comprising an advertisement;

receiving the data signal at the at least one apparatus within the selected apparatus group;

storing the data signal on the at least one apparatus within the selected apparatus group;

receiving a video/audio signal from a main source at the at least one apparatus within the selected apparatus group;

combining the video/audio signal with the data signal to form a single combined signal; and displaying the combined signal on a video display unit, wherein the step of displaying the combined signal comprises the step of displaying the video signal and the data signal simultaneously on the video display unit such that the data signal is controlled and maintained independent and regardless of any operational control of, or switching of the main source of the video/audio signal by a viewer of the video display unit.

2. The method according to claim 1 wherein the step of generating a data signal comprises the step of generating a data signal on a remote computer.

3. The method according to claim 2 wherein the step of transmitting the data signal to an apparatus group comprises the step of connecting the at least one apparatus within the selected apparatus group with a remote computer.

4. The method according to claim 3 wherein the step of connecting includes the use of a modem.

5. The method according to claim 1 wherein the step of combining comprises the step of:
  resizing the video signal;
  positioning the video signal along a portion of the video display unit; and
  positioning the data signal so as to be separate from the video signal on the video display unit.

6. The method according to claim 1 wherein the step of combining comprises the steps of:
  positioning the video signal along a portion of the video display unit; and
  positioning the data signal so as to overlie at least a portion of the video display unit.

7. The method according to claim 1 wherein the step of displaying comprises the step of displaying the combined signal on a plurality of video display units.

8. The method according to claim 1 wherein the video signal comprises one of the group consisting of terrestrial signals, cable signals, satellite signals, local cameras, remote cameras, video tape recorders and/or DVD players.

9. The method according to claim 1 further comprising the step of decoding the data signal with the at least one apparatus within the selected apparatus group, to in turn, create and manipulate at least one of text and graphics represented by the data signal.

10. The method according to claim 1 further comprising the step of scheduling the combining, and, in turn, displaying of the data signal.

11. The method according to claim 10 wherein the step of scheduling is accomplished by the at least one apparatus within the selected apparatus group.

12. A method for transmitting data signals to video display units comprising the steps of:
  grouping at least apparatus from a plurality of apparatuses based on geographic area or type of establishment into an apparatus group;
  associating the at least one apparatus with at least one video display unit;
  associating the at least one apparatus with a server;
  creating a data signal comprising an advertisement;
  selecting the apparatus group comprising the at least one apparatus wherein the selection is based, at least in part, on the geographic area or type of establishment;
  transmitting the data signal over a computer network to the selected apparatus group comprising the at least one apparatus; and
  transmitting a video signal from a main source to the selected apparatus group comprising the at least one apparatus;
  combining the video signal with the data signal;
  transmitting the combined signal from the at least one apparatus to the at least one video display unit; and
  displaying the combined signal on the video display unit, wherein the step of displaying the combined signal comprises the step of displaying the video signal and the data signal simultaneously on the video display unit, where the data signal is controlled and maintained independent and regardless of any operational control of, or switching of the main source of the video signal by a viewer of the video display unit.

13. The method of claim 12 wherein the step of associating an apparatus with a video display unit comprises the step of associating a plurality video display units each with a single apparatus.

14. The method of claim 13 wherein the step of transmitting a data signal from the data source to the at least one apparatus comprises the step of transmitting a unique data signal from the data source to each of the apparatuses.

15. The method of claim 14 further comprising the steps of:
  transmitting a video signal to each apparatus within the selected group;
  combining the video signal with the data signal at each apparatus within the selected group; and
  transmitting the combined video signal along with the step of transmitting the data signal from each apparatus within the selected group to a video display unit.

16. The method of claim 15 wherein each apparatus receives a single video signal.

17. The method of claim 15 wherein each apparatus receives a unique video signal.

18. The method of claim 12 wherein the video signal comprises one of the group consisting of terrestrial signals, cable signals, satellite signals, local cameras, remote cameras, video tape recorders and/or DVD players.

19. A method for combining data signals and video signals for transmission to a video display unit, the method comprising the steps of:
  grouping at least one apparatus from a plurality of apparatuses into a group wherein the grouping is based on geographic area or type of establishment;
  selecting the apparatus group comprising the at least one apparatus wherein the selection is based, at least in part, on the geographic area or type of establishment;
  transmitting a data signal comprising an advertisement from a server to the selected apparatus group;
  receiving the data signal at the selected apparatus group;
  storing the data signal on the at least one apparatus within the group;
  receiving a video/audio signal from a main source at the selected apparatus group;
  combining the video/audio signal with the data signal to form a single combined signal; and
  displaying the combined signal on a video display unit such that the video signal and the data signal are displayed simultaneously on the video display unit and the data signal is controlled and maintained independent and regardless of any operational control of, or switching of the main source of the video/audio signal by a viewer of the video display unit.

\* \* \* \* \*